United States Patent
Yokoyama et al.

(10) Patent No.: US 11,992,902 B2
(45) Date of Patent: May 28, 2024

(54) SOLDER ALLOY AND SOLDER JOINT

(71) Applicant: Senju Metal Industry Co., Ltd., Tokyo (JP)

(72) Inventors: Takahiro Yokoyama, Tokyo (JP); Shunsaku Yoshikawa, Tokyo (JP)

(73) Assignee: Senju Metal Industry Co., Ltd., Tokyo (JP)

( * ) Notice: Subject to any disclaimer, the term of this patent is extended or adjusted under 35 U.S.C. 154(b) by 15 days.

(21) Appl. No.: 17/896,321

(22) Filed: Aug. 26, 2022

(65) Prior Publication Data
US 2023/0084073 A1    Mar. 16, 2023

(30) Foreign Application Priority Data

Aug. 27, 2021 (JP) ................................. 2021-138901

(51) Int. Cl.
| | | |
|---|---|---|
| *B23K 35/26* | (2006.01) | |
| *B23K 35/02* | (2006.01) | |
| *B23K 101/42* | (2006.01) | |
| *C22C 1/02* | (2006.01) | |
| *C22C 1/03* | (2006.01) | |
| *C22C 13/00* | (2006.01) | |

(52) U.S. Cl.
CPC ........ *B23K 35/262* (2013.01); *B23K 35/0222* (2013.01); *C22C 1/02* (2013.01); *C22C 1/03* (2013.01); *C22C 13/00* (2013.01); *B23K 2101/42* (2018.08)

(58) Field of Classification Search
CPC .............. B23K 35/262; B23K 2101/42; B23K 35/0222; C22C 13/00; C22C 1/02; C22C 1/03

See application file for complete search history.

(56) References Cited

U.S. PATENT DOCUMENTS

| | | |
|---|---|---|
| 6,180,055 B1 | 1/2001 | Tetsuro |
| 7,005,106 B2 | 2/2006 | Izumida et al. |
| 7,338,567 B2 | 3/2008 | Munekata et al. |
| 2004/0126270 A1* | 7/2004 | Izumida ............... B23K 35/262 |
| | | 420/560 |
| 2010/0297470 A1 | 11/2010 | Munekata et al. |

(Continued)

FOREIGN PATENT DOCUMENTS

| | | |
|---|---|---|
| CN | 101733578 A | 6/2010 |
| EP | 0985486 A1 | 3/2000 |
| JP | 2001334384 A | 12/2001 |

(Continued)

*Primary Examiner* — Adil A. Siddiqui
(74) *Attorney, Agent, or Firm* — The Webb Law Firm

(57) ABSTRACT

Provided are a solder alloy and a solder joint, which have a narrow ΔT to suppress solder bridges and solder icicles, and a small amount of dross generated in a solder tank, suppress Cu leaching, and have higher strength. The solder alloy has an alloy composition of, by mass %, Cu: more than 2.0% and less than 3.0%; Ni: 0.010% or more and less than 0.30%; and Ge: 0.0010 to 0.20% with the balance being Sn. Preferably, by mass %, Cu is more than 2.5% and less than 3.0%, and the alloy composition satisfies the following relations (1) and (2): $2.400 \leq Cu+Ni+Ge \leq 3.190$ (1), and $0.33 \leq Ge/Ni \leq 1.04$ (2). Cu, Ni, and Ge in the relations (1) and (2) each represent the contents (mass %) in the alloy composition.

4 Claims, 1 Drawing Sheet

(56) References Cited

U.S. PATENT DOCUMENTS

2022/0072664 A1*  3/2022  Pandher ............... B23K 35/262
2022/0143761 A1    5/2022  Yoshikawa et al.

FOREIGN PATENT DOCUMENTS

| JP | 200394195 A | 4/2003 | | |
|---|---|---|---|---|
| JP | 4673552 B2 | 1/2011 | | |
| KR | 1020210104144 A | 8/2021 | | |
| WO | 2020067307 A1 | 4/2020 | | |
| WO | WO-2020135932 A1 * | 7/2020 | ........... | B23K 35/262 |
| WO | 2020262040 A1 | 12/2020 | | |

* cited by examiner

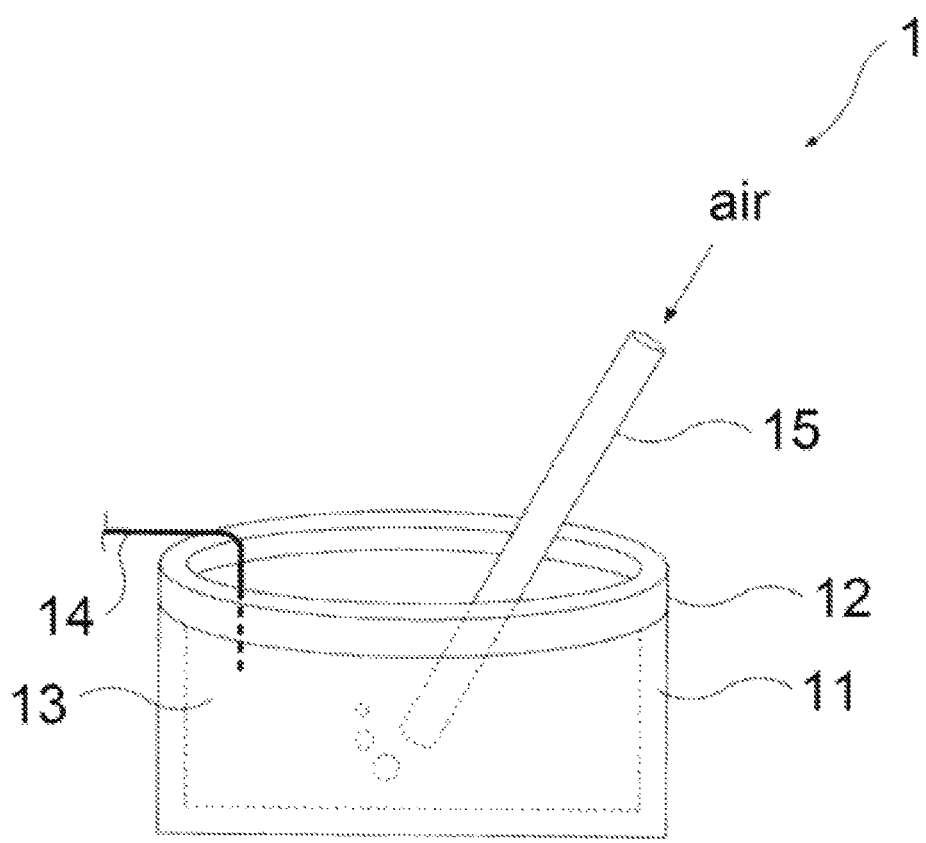

SOLDER ALLOY AND SOLDER JOINT

CROSS-REFERENCE TO RELATED APPLICATION

This application claims priority to Japanese Patent Application No. 2021-138901 filed Aug. 27, 2021, the disclosure of which is hereby incorporated by reference in its entirety.

BACKGROUND

Field

The present invention relates to a solder alloy and a solder joint that are used in various electronic devices.

Description of Related Art

A printed circuit board including electronic components mounted thereon is used in home appliances such as washing machines, refrigerators, and air conditioners, and electronic devices such as televisions, video players, radios, computers, copying machines, and communication equipment. Examples of a process for mounting electronic components include flow soldering, reflow soldering, manual soldering, dip soldering, and the like.

Dip soldering is employed for electronic components having a certain degree of size. Dip soldering is a method involving immersing terminals of the electronic components in a solder tank to remove insulation films and to perform pre-solder plating. As a technique for mounting such electronic components on the printed circuit board, flow soldering, in which terminals are inserted into through-holes of the board, is also employed. Flow soldering is a method of performing soldering by applying a jet flow from a solder tank to a connection surface side of the printed circuit board.

In dip soldering and flow soldering, the terminals remain in molten solder for a long time, resulting in the occurrence of Cu leaching due to the molten solder in the solder tank. Since the solder tank is exposed to the atmosphere for a long time, dross generated in the solder tank must be removed at regular intervals. Furthermore, a large amount of the dross causes solder bridges and solder icicles.

Therefore, Patent Document 1, for example, discloses a Sn—Cu—Ni—Ge solder alloy as a solder alloy for dip soldering. This solder alloy has been examined with an alloy composition containing predetermined amounts of Cu, Ni, and Ge to suppress the generation of solder bridges and Cu leaching of the terminals as well as to reduce the amount of suspended matter present in the solder tank.

Patent Document 2 discloses a solder alloy obtained by adding Ge as an optional element to a Sn—Cu—Ni solder alloy. In the solder alloy described in this patent Document, terminals of electronic components are immersed in molten solder to simultaneously perform both coating film stripping and soldering of the terminals, and the contents of Cu and Ni are also adjusted to suppress Cu leaching. This patent Document also discloses that the solder alloy contains Ge to suppress the generation of an oxide coating film.

Patent Document 3, for example, describes a Sn—Cu—P—Ge—Ni solder alloy containing both P and Ge as a solder alloy for flow soldering, from the viewpoint of suppressing oxidation of a Sn—Cu solder alloy. The invention described in Patent Document 3 contains Cu and Ni to improve the mechanical strength of the solder alloy. The solder alloy described in this patent Document contains P as an essential element, the addition of Ge further improves wettability.

Patent Document 1: Japanese Patent No. 4673552 B2
Patent Document 2: Japanese Unexamined Patent Application Publication No. 2001-334384
Patent Document 3: Japanese Unexamined Patent Application Publication No. 2003-94195

SUMMARY

However, while the solder alloy described in Patent Document 1 has been evaluated with respect to solder bridges and Cu leaching, the reduction amount of suspended matter has not been proven. This patent Document describes that the suspended matter adheres to the surface of a soldered portion to make the soldered portion rough, thereby making it difficult to achieve uniform solder thickness, but there is a limit to qualitative removal of the suspended matter. In addition, quantitative observation of the amount of suspended matter is indispensable for reducing manufacturing costs and shortening manufacturing time. Furthermore, given the recent dramatic progress in miniaturization and high performance of electronic components, and much narrower terminal intervals compared to the time of the filing of Patent Document 1, it is desirable to significantly reduce solder bridges and Cu leaching.

In addition to this, in view of the description in paragraph [0003] of Patent Document 1, the mechanical properties in this patent Document indicate the joining strength of the joining interface. Yet, as electronic components are miniaturized, joint sites also become smaller. Thus, in alloy composition search, it is essential to pay attention not to the joining strength but to the strength of the solder alloy after joining. However, in the invention described in Patent Document 1, the composition search to improve the strength of the solder alloy is not conducted.

The invention described in Patent Document 2 has been evaluated for Cu leaching and solderability, and the alloy design has been made to show excellent results in these evaluations. In dip soldering and flow soldering, it is very important to suppress Cu leaching. In these joining methods, however, alloy design that focuses only on the point of suppressing Cu leaching does not match the actual situations. Therefore, when designing an alloy, it is necessary to consider the suppression of the solder bridges which is evaluated in the invention described in Patent Document 1; reduction of the amount of dross which is not quantitatively evaluated in Patent Document 1; and improvement of the strength of the solder alloy.

Here, Patent Document 2 describes that the addition of Ag and Sb is effective in a Sn—Cu—Ni—Ge solder alloy to improve the strength of the solder alloy. However, since the increased number of additive elements will affect various properties, it is preferable to design an alloy that simultaneously satisfies all effects only with the four constituent elements, if possible.

The invention described in Patent Document 3 has been evaluated with respect to the strength of the solder alloy, which is one of the properties required in mounting electronic components. However, no evaluation has been conducted on suppression of solder bridges and solder icicles, reduction of the amount of dross, and Cu leaching, there is still room for improvement by examining the alloy composition again.

In addition to the above-described problems, it is necessary to prevent the liquidus temperature from becoming high to reduce the generation of solder bridges and solder icicles. In view of heat resistance and the like of electronic components, the soldering temperature when performing dip soldering and flow soldering cannot be easily changed according to the convenience of the solder alloy. In addition, even at a low liquidus temperature, it takes time to complete solidification if the solidus temperature is further low, resulting in the generation of solder bridges and solder icicles. For this reason, it is also necessary to design an alloy so that a temperature difference ΔT between the liquidus temperature and the solidus temperature is small.

An object of the present invention is to provide a solder alloy and a solder joint, which have a narrow ΔT to suppress solder bridges and solder icicles, and a small amount of dross generated in a solder tank, suppress Cu leaching, and have higher strength.

The present inventors extracted from the solder alloys disclosed in each patent Document what might be capable of achieving the object through various studies. They extracted Sn-2Cu-0.2Ni-0.05Ge and Sn-3Cu-0.2Ni-0.1Ge solder alloys from Patent Document 1, a Sn-2.5Cu-0.30Ni-0.50Ge solder alloy from Patent Document 2, and a Sn-0.7Cu-0.05Ni-0.003P-0.01Ge solder alloy from Patent Document 3 and examined whether the alloys were suitable for an actual use environment.

First of all, it is difficult to maintain the desired alloy composition of the solder alloy containing P extracted from Patent Document 3 because a very small amount of P is released from the molten solder at an early stage in an environment where the alloy always comes in contact with the atmosphere in a molten state. In addition, even with an alloy composition having an increased content of P, the solder tank must be constantly replenished with P since the amount of P largely decreases. Furthermore, the alloy composition of the solder alloy containing P tends to vary in content depending on P, which may cause variations in effectiveness. Moreover, Ga, which is known as an oxidation suppressing element as P, has a low melting point of 30° C. or less, resulting in the same problems as those associated with P. For this reason, it is necessary to study with constituent elements that do not contain P or Ga to achieve the above object.

The present inventors investigated the problems of the solder alloys extracted from Patent Documents 1 and 2, which are four constituent elements. As a result, it was found that the Sn-2Cu-0.2Ni-0.05Ge solder alloy extracted from Patent Document 1 had a low content of Cu, which brought about inferior Cu leaching. It was also found that the Sn-3Cu-0.2Ni-0.1Ge solder alloy extracted from this patent Document had a high content of Cu, which increased the liquidus temperature, resulting in a large ΔT and the generation of solder bridges and solder icicles. It was found that the Sn-2.5Cu-0.30Ni-0.50Ge solder alloy extracted from Patent Document 2 had a high content of Ge, resulting in a large ΔT and the generation of solder bridges and solder icicles.

The present inventors precisely adjusted Cu and Ge contents in a Sn—Cu—Ni—Ge solder alloy based on these findings. It was found that even if these two elements were adjusted, the relative contents of Ni and Sn also varied, and there were compositions in which the alloy as a whole did not exhibit the desired effect. Therefore, the Ni content was precisely adjusted.

Since the Sn—Cu—Ni—Ge solder alloy had been investigated in detail to some extent for the content of each constituent element, as examined in Patent Documents 1 to 3, it was believed that a solder alloy exhibiting better effects could not be obtained. However, as a result of detailed investigation, it was unexpectedly found that when Cu, Ni, and Ge are within predetermined ranges, the alloy has a narrow ΔT to suppress solder bridges and solder icicles and a small amount of dross generated in a solder tank, suppress Cu leaching, and have higher strength, and then the present invention was completed.

The present invention obtained based on these findings is as follows.

(0) A solder alloy having an alloy composition consisting of, by mass %, Cu: more than 2.0% and less than 3.0%; Ni: 0.010% or more and less than 0.30%; and Ge: 0.0010 to 0.20%, with the balance being Sn.

(1) A solder alloy having an alloy composition consisting of, by mass %: Cu: more than 2.0% and less than 3.0%, Ni: 0.010% or more and less than 0.30%, and Ge: 0.0010 to 0.20%, with the balance being Sn, wherein the alloy composition satisfies the following relations (1) and (2):

$$2.400\% \leq Cu+Ni+Ge \leq 3.190\% \quad \text{relation (1)}$$

$$0.33 \leq Ge/Ni \leq 1.04 \quad \text{relation (2)}$$

wherein Cu, Ni, and Ge in the relations (1) and (2) each represent the contents (mass %) thereof in the alloy composition.

(2) The solder alloy according to (1), wherein, by mass %, Cu: more than 2.5% and less than 3.0%.

(3) A solder alloy having an alloy composition consisting of, by mass %: Cu: more than 2.5% and less than 3.0%, Ni: 0.010% or more and less than 0.30%, and Ge: 0.0010 to 0.20%, with the balance being Sn.

(4) A solder joint comprising the solder alloy according to (1).

(5) A solder joint comprising the solder alloy according to (2).

(6) A solder joint comprising the solder alloy according to (3).

BRIEF DESCRIPTION OF THE DRAWING

FIG. 1 is a schematic view of a dross occurrence apparatus.

DETAILED DESCRIPTION

Embodiments of the present invention will be described in more detail below. In the present specification, "%" used for indicating a solder alloy composition is "mass %" unless otherwise specified.

1. Solder Alloy (1) Cu: more than 2.0% and less than 3.0%

Cu can improve strength of a solder alloy and also suppress Cu leaching. If the Cu content is 2.0% or less, Cu leaching may occur, and the strength may be reduced. In terms of the lower limit, the Cu content is more than 2.0%, preferably 2.1% or more, more preferably 2.3% or more, and further preferably 2.5% or more. On the other hand, if the Cu content is 3.0% or more, the liquidus temperature increases, resulting in a large ΔT. Solder bridges and solder icicles also increase. Furthermore, coarse intermetallic compounds are generated, and the strength is reduced. In addition to this, solderability deteriorates. In terms of the upper limit, the Cu content is less than 3.0%, preferably 2.9% or less, more preferably 2.8% or less, further preferably 2.7% or less, and particularly preferably 2.6% or less.

(2) Ni: 0.010% or more and less than 0.30%

Ni can improve the strength of the solder alloy and also suppress Cu leaching since it forms an all-proportional solid solution with Cu. If the Ni content is less than 0.010%, Cu leaching may occur, and the strength may be reduced. In terms of the lower limit, the Ni content is 0.010% or more, preferably 0.050% or more, more preferably 0.10% or more, and even more preferably 0.15% or more. On the other hand, if the Ni content is 0.30% or more, the liquidus temperature increases, resulting in a large $\Delta T$. Solder bridges and solder icicles also increase. Furthermore, coarse intermetallic compounds are generated, and the strength is reduced. In addition to this, solderability deteriorates. In terms of the upper limit, the Ni content is less than 0.30%, preferably 0.29% or less, more preferably 0.24% or less, further preferably 0.22% or less, particularly preferably 0.20% or less, and most preferably 0.16% or less.

(3) Ge: 0.0010 to 0.20%

Ge can suppress oxidation of the molten solder and generation of solder bridges and solder icicles. If the Ge content is less than 0.0010%, the oxidation suppressing effect is reduced. Thus, dross is generated, and solder bridges and solder icicles increase. In terms of the lower limit, the Ge content is 0.0010% or more, preferably 0.0050% or more, and more preferably 0.0100% or more. It is further preferably 0.0600% or more. On the other hand, if the Ge content is more than 0.20%, the viscosity of the molten solder increases and solderability deteriorates. The liquidus temperature also increases, resulting in a large $\Delta T$. In addition, solder bridges and solder icicles increase. In terms of the upper limit, the Ge content is 0.2000% or less, preferably 0.1400% or less, and more preferably 0.1000% or less.

(4) Balance: Sn

The balance of the solder alloy according to the present invention is Sn. The solder alloy may contain unavoidable impurities besides the elements described above. Even when the solder alloy contains unavoidable impurities, this inclusion does not affect the effects described above.

(5) P, Ga, and Co

It is preferable that the solder alloy according to the present invention do not contain P, Ga, or Co. It is difficult to control P and Ga since they rapidly disappear into the atmosphere or as dross in a molten state in a solder tank. In addition, Ga promotes the generation of solder bridges and solder icicles due to increased viscosity, which increases the amount of dross. P causes an increase in the liquidus temperature, thus increasing $\Delta T$ and promoting the generation of solder bridges and solder icicles due to increased viscosity. Although Co is not a problem when added in very small amounts, the melting point increases as the content increases, resulting in a large $\Delta T$. It also causes the generation of solder bridges and solder icicles.

(6) Relations (1) and (2)

$$2.400\% \leq Cu+Ni+Ge \leq 3.190\% \quad (1)$$

$$0.33 \leq Ge/Ni \leq 1.04 \quad (2)$$

Cu, Ni, and Ge in the relations (1) and (2) each represent the contents (mass %) in the alloy composition.

The solder alloy according to the present invention preferably satisfies the relations (1) and (2). The solder alloy satisfying all relations exhibits particularly excellent effects.

The relation (1) indicates a range of the total amount of additive elements constituting the solder alloy according to the present invention. Since the solder alloy according to the present invention can simultaneously exhibit diverse properties due to the additive elements Cu, Ni, and Ge, it is preferable that the total amount of these elements be precisely regulated. If the total amount of these additive elements is within the above range, the critical significance of each constituent element near the upper limit is mutually complemented, and they can work in tandem with each other to simultaneously exhibit various properties. More specifically, since Cu and Ni contribute to the formation of compounds during solidification, they contribute to solder bridges and solder icicles, amount of dross, improvement of the strength, and reduction of Cu leaching. Ge also contributes to the amount of dross since it forms oxides with oxygen in the atmosphere. Hence, the effects of the present invention are exhibited at a higher level when the total amount of these elements is regulated so as to satisfy the relation (1).

In terms of the lower limit, the value of "Cu+Ni+Ge" in the relation (1) is preferably 2.400% or more, more preferably 2.610% or more, further preferably 2.701% or more, particularly preferably 2.710% or more, and most preferably 2.760% or more. In terms of the upper limit, the value of "Cu+Ni+Ge" in the relation (1) is preferably 3.190% or less, more preferably 3.100% or less, even more preferably 2.900% or less, further preferably 2.890% or less, particularly preferably 2.840% or less, and most preferably 2.800% or less.

The relation (2) indicates a ratio of Ge content to Ni content. In the solder alloy according to the present invention, Ni and Ge contribute to the suppression of solder bridges and solder icicles. Cu also contributes to this, but its content is an order of magnitude higher than that of Ni and Ge. In the solder alloy according to the present invention, however, even Ni and Ge of which content are less than 1% significantly contribute to the properties. For this reason, the content ratio of Ge to Ni is important for obtaining even better effects. A high Ni content promotes the generation of solder bridges and solder icicles, while a low Ge content promotes the generation of solder bridges and solder icicles. In view of this, it is important to regulate the content ratio of Ge to Ni.

In terms of the lower limit, the value of "Ge/Ni" in the relation (2) is preferably 0.33 or more, more preferably 0.34 or more, and even more preferably 0.42 or more. In terms of the upper limit, the value of "Ge/Ni" in the relation (2) is preferably 1.04 or less, more preferably 1.00 or less, even more preferably 0.70 or less, particularly preferably 0.63 or less, and most preferably 0.50 or less.

2. Solder Joint

The solder joints according to the present invention are used in connecting electronic components to their boards, or in joining and connecting packaged components to a printed circuit board. In other words, the solder joint according to the present invention refers to a connecting part of an electrode and can be formed using general soldering conditions.

3. Method for Manufacturing Solder Alloy

A method for manufacturing the solder alloy preferably includes the following steps so that each constituent element of the solder alloy according to the present invention will exhibit an excellent effect within the above-described range. Here, the "mother alloy" means raw material of "the present alloy" having the desired alloy composition.

(1) Step of Forming Mother Alloy

Since Cu, Ni, and Ge each have a high melting point, it takes a very long time to melt them if a predetermined amount of each element is weighed from the ingot and attempted to be molten at once as in a conventional method. Especially, Ge is considered to preferentially react with oxygen in the atmosphere during melting since it has an oxidation suppressing effect. For this reason, when adding a predetermined amount of Ge, it has conventionally been necessary to weigh the amount considering the melting temperature, melting time, and the amount of Ge that disappears as an oxide. Therefore, in the manufacture of the solder alloy according to the present invention, Cu, Ni, and Ge are manufactured as Sn—Cu, Sn—Ni, and Sn—Ge mother alloys, respectively, and the present alloy is produced from these mother alloys. Alternatively, Sn—Ni and Sn—Ge mother alloys may be manufactured and then mixed with Cu alone to produce the present alloy. Consequently, the total time for manufacturing the present alloy is reduced, thus allowing it to be manufactured in a shorter time and reducing the loss of Ge.

However, if a large number of coarse intermetallic compounds having high melting points ($Cu_6Sn_5$ and $Ni_3Sn_4$) are formed in the mother alloy, the time required to heat the alloy to a temperature at which the intermetallic compounds are sufficiently melted during the production of the present alloy will be extended, resulting in longer manufacturing time than that for alloys with relatively less formation of intermetallic compounds.

Therefore, it is necessary to regulate the cooling rate during solidification to prevent the formation of the coarse intermetallic compounds having high melting points when producing the mother alloy. In a temperature range between the liquidus temperature and the solidus temperature, the cooling rate is specifically set to 50° C./sec or more between 200° C. and 400° C., which is within the temperature range between the liquidus temperature and solidus temperature for Sn—Cu—Ni-based intermetallic compounds.

(2) Step of Forming the Present Alloy

Thereafter, the Present alloy is produced in the temperature range of the liquidus temperature of the present alloy+ 30° C. to the liquidus temperature of the present alloy+50° C. using the mother alloy produced through this step. For example, the mother alloy is melted in the temperature range of approximately 430 to 450° C. to manufacture the present alloy.

If the mother alloy is sufficiently melted and then cooled by air cooling as in a conventional method, coarse intermetallic compounds having high melting points will be generated. Therefore, it should be cooled under the same conditions as when the mother alloy is produced. The present alloy produced under these conditions has various advantages: 1. avoidance of generation of coarse intermetallic compounds; 2. uniform alloy composition; and 3. reduction of environmental impact by reducing the amount of oxides (amount of dross) after production.

Particularly, the production of the present alloy under these conditions is effective in the range where the Cu content of the solder alloy according to the present invention is more than 2% and less than 3%. If the Cu content is 2% or less, Cu leaching suppressing effect is reduced. In addition, if the Cu content is 3% or more, it is not practical because the liquidus temperature increases, causing deterioration of solderability and generation of solder bridges and solder icicles.

4. Method for Forming Solder Joint

A jointing method with the solder alloy according to the present invention may be performed according to an ordinary method using, for example, a flow method. The heating temperature may be appropriately adjusted depending on the heat resistance of the electronic components or the liquidus temperature of the solder alloy. When the joining is performed with the solder alloy according to the present invention, the structure can be further refined by considering a cooling rate during solidification. For example, the solder joint is cooled at a cooling rate of 2 to 3° C./s or more. It may be cooled under the same conditions as when the "the present alloy" is produced. Other joining conditions can be appropriately adjusted depending on the alloy composition of the solder alloy.

Examples

Solder alloys consisting of alloy compositions shown in Table 1 were prepared as follows.

First, Sn—Cu, Sn—Ni, and Sn—Ge were each manufactured as mother alloys from ingots of each constituent element. In manufacturing each of the mother alloys, the cooling rate was regulated to be 50° C./sec between 200 and 400° C. by circulating cooling water using a chiller or the like. From the mother alloys manufactured in this manner, the mother alloys were weighed to reach the contents listed in Table 1, and then the cooling rate was regulated to be 50° C./sec between 200 and 400° C. by circulating cooling water using a chiller or the like to produce the present alloy in the same manner as the mother alloys. Regarding P and Co used in Comparative Examples, the mother alloys were produced as well in the same manner as described above (that is, Sn—P, and Sn—Co), and the present alloy was obtained from the mother alloys to reach the contents shown in Table 1. Ga was added alone to obtain the present alloy.

The present alloy (solder alloy) obtained through this preparation was evaluated for ΔT, obtained from the liquidus temperature and solidus temperature, solder bridges and solder icicles, tensile strength, amount of dross, and Cu leaching. Evaluation methods and evaluation criteria for each item are as follows.

ΔT

To determine ΔT, liquidus and solidus temperatures were measured by DSC in accordance with JIS Z 3198-1 (2014). When the ΔT, obtained by subtracting the solidus temperature from the liquidus temperature, was less than 110° C., it was evaluated as "Excellent"; when the ΔT was 110 to 120° C., it was evaluated as "Good"; when the ΔT was more than 120° C. and 130° C. or less, it was evaluated as "Acceptable"; and when the ΔT was more than 130° C., it was evaluated as "Poor". When evaluations of the ΔT were "Good" and "Excellent", there was no problem in practical use.

Solder Bridges and Solder Icicles

Twelve 4-terminal Sn plated resistances with a terminal width of 0.5 mm and a terminal interval of 0.8 mm were first prepared, the terminals were then inserted in through-holes of a glass epoxy printed circuit board (CEM-3), and the present alloy manufactured as described above was introduced into a solder tank to perform flow soldering. The flow soldering was performed under the following test conditions using Flow Simulator FS-1 manufactured by Malcom Co., Ltd.

Test Conditions

Solder tank: Flow Simulator FS-1 manufactured by Malcom Co., Ltd.
Amount of solder: 15 kg
Flux: Flux (trade name: ES-1061SP2) manufactured by Senju Metal Industry Co., Ltd.
Solder temperature in solder tank: 255° C.

Whether or not solder bridges were generated was visually evaluated. Whether or not solder icicles were generated in a fillet was also visually observed. When no solder bridges or solder icicles could be observed, it was evaluated as "Excellent"; when the number of resistances with solder bridges or solder icicles generated was 1 to 2, it was evaluated as "Good"; when the number of resistances with solder bridges or solder icicles generated was 3 to 4, it was evaluated as "Acceptable"; and when the number of resistances with solder bridges or solder icicles generated was 5 or more, it was evaluated as "Poor". When evaluations of the solder bridges or solder icicles were "Good" and "Excellent", there was no problem in practical use.

Tensile Strength

The tensile strength was measured in accordance with JIS Z 3198-2 (2003). The present alloy, each of the solder alloys produced as described above and listed in Table 1, was cast into a mold to produce a specimen with a gauge length of 30 mm and a diameter of 8 mm. The produced specimen was pulled by Type 5966 manufactured by Instron Corporation at room temperature at a stroke of 6 mm/min to measure the strength upon fracture of the specimen. When the tensile strength was 38 MPa or more, it was evaluated as "Excellent"; when the tensile strength was 33 MPa or more and less than 38 MPa, it was evaluated as "Good": and when the tensile strength was less than 33 MPa, it was evaluated as "Poor". When evaluations of the tensile strength were "Good" and "Excellent", there was no problem in practical use.

Dross Weight

FIG. 1 is a schematic view of a dross occurrence apparatus 1 for measuring dross weight. Into a solder tank 12 with a volume of 150 cc, which was capable of being heated by a heater 11, 1000 g of the present alloy, the solder alloy produced as described above and shown in Table 1, was introduced. The solder alloy introduced into the solder tank 12 was heated and molten to be a solder bath 13 so that the temperature of the solder alloy was 400° C. measured by a temperature sensor 14. The air was then blown into the solder bath 13 for 10 minutes through a gas pipe 15 at a condition of 150 cc/min. After finishing the blow, dross formed on the surface of the solder bath 13 was gathered, and its dross weight was measured. A dross weight of 25 g or less was evaluated as "Excellent"; a dross weight of more than 25 g and 30 g or less was evaluated as "Good"; a dross weight of more than 30 g and 35 g or less was evaluated as "Acceptable"; and a dross weight of more than 35 g was evaluated as "Poor". When evaluations of the dross weight were "Good" and "Excellent", there was no problem in practical use.

Cu Leaching

The present alloy, each of the solder alloys produced as described above and listed in Table 1, was put into a small jet soldering tank with a capacity of 15 kg and brought into a molten state at 260° C. The jet height from the nozzle of the jet soldering tank was then adjusted to be 5 mm. The test sample used in this Example was obtained by cutting an FR-4 glass epoxy substrate having copper wiring with a thickness of 35 μm into an appropriate size.

The test method included applying a pre-flux to the surface of the copper wiring of the test sample and preheating it for about 60 seconds to bring the temperature of the substrate to about 120° C. Thereafter, the test sample was placed 2 mm above the nozzle of the jet soldering tank and immersed in jetting molten solder for 3 seconds. This step was performed repeatedly, and the number of times of immersion until the dimension of the copper wiring on the test sample was reduced by half was measured. Those which did not decrease in dimension by half after immersion seven times or more were evaluated as "Excellent"; those which did not decrease in dimension by half in five to six immersions were evaluated as "Good"; those which did not decrease by half in dimension in three to four immersions were evaluated as "Acceptable"; and those which decreased in dimension by half in two or fewer immersions were evaluated as "Poor". When evaluations of the number of times of immersion was carried out were "Good" and "Excellent", there was no problem in practical use.

Evaluation results are shown in Table 1.

TABLE 1

| | Alloy composition (mass %) | | | | | | | Relation (1) (Cu + Ni + Ge) | Relation (2) Ge/Ni |
|---|---|---|---|---|---|---|---|---|---|
| | Sn | Cu | Ni | Ge | Ga | P | Co | | |
| EX. 1 | bal. | 2.1 | 0.20 | 0.1000 | | | | 2.400 | 0.50 |
| EX. 2 | bal. | 2.5 | 0.20 | 0.1000 | | | | 2.800 | 0.50 |
| EX. 3 | bal. | 2.6 | 0.20 | 0.1000 | | | | 2.900 | 0.50 |
| EX. 4 | bal. | 2.7 | 0.20 | 0.1000 | | | | 3.000 | 0.50 |
| EX. 5 | bal. | 2.8 | 0.20 | 0.1000 | | | | 3.100 | 0.50 |
| EX. 6 | bal. | 2.9 | 0.20 | 0.1000 | | | | 3.200 | 0.50 |
| Ref. EX. 7 | bal. | 2.5 | 0.01 | 0.1000 | | | | 2.610 | 10.00 |
| EX. 8 | bal. | 2.5 | 0.10 | 0.1000 | | | | 2.700 | 1.00 |
| EX. 9 | bal. | 2.5 | 0.16 | 0.1000 | | | | 2.760 | 0.63 |
| EX. 10 | bal. | 2.5 | 0.24 | 0.1000 | | | | 2.840 | 0.42 |
| EX. 11 | bal. | 2.5 | 0.29 | 0.1000 | | | | 2.890 | 0.34 |
| Ref. EX. 12 | bal. | 2.5 | 0.20 | 0.0010 | | | | 2.701 | 0.01 |
| Ref. EX. 13 | bal. | 2.5 | 0.20 | 0.0100 | | | | 2.710 | 0.05 |
| Ref. EX. 14 | bal. | 2.5 | 0.20 | 0.0600 | | | | 2.760 | 0.30 |
| EX. 15 | bal. | 2.5 | 0.20 | 0.1400 | | | | 2.840 | 0.70 |
| EX. 16 | bal. | 2.5 | 0.20 | 0.2000 | | | | 2.900 | 1.00 |
| Comp. Ex. 1 | bal. | 0.693 | 0.02 | | 0.0050 | | | 0.713 | 0.00 |
| Comp. Ex. 2 | bal. | 0.7 | 0.05 | 0.0100 | | 0.0030 | | 0.760 | 0.20 |
| Comp. Ex. 3 | bal. | 1 | 0.040 | 0.0100 | | | | 1.050 | 0.25 |
| Comp. Ex. 4 | bal. | 2.0 | 0.20 | 0.0500 | | | | 2.250 | 0.25 |

TABLE 1-continued

| | | | | | | | | |
|---|---|---|---|---|---|---|---|---|
| Comp. Ex. 5 | bal. | 3 | 0.20 | 0.1000 | | | 3.300 | 0.50 |
| Comp. Ex. 6 | bal. | 2.5 | 0.005 | 0.1000 | | | 2.605 | 20.00 |
| Comp. Ex. 7 | bal. | 2.5 | 0.31 | 0.1000 | | | 2.910 | 0.32 |
| Comp. Ex. 8 | bal. | 2.5 | 0.20 | 0.0005 | | | 2.701 | 0.00 |
| Comp. Ex. 9 | bal. | 2.5 | 0.20 | 0.2100 | | | 2.910 | 1.05 |
| Comp. Ex. 10 | bal. | 2.5 | 0.30 | 0.5000 | | | 3.300 | 1.67 |
| Comp. Ex. 11 | bal. | 2.5 | 0.20 | 0.0100 | 0.0100 | | 2.710 | 0.05 |
| Comp. Ex. 12 | bal. | 2.5 | 0.20 | — | | 0.2000 | 2.700 | 0.00 |
| Comp. Ex. 13 | bal. | 2.5 | 0.20 | 0.1000 | | 0.2000 | 2.800 | 0.50 |
| Comp. Ex. 14 | bal. | 3.0 | 0.03 | 0.0050 | | 0.0030 | 3.035 | 0.17 |
| Comp. Ex. 15 | bal. | 2.5 | 0.20 | 0.1000 | | | 0.2000 | 2.800 | 0.50 |
| Comp. Ex. 16 | bal. | 2.5 | 0.20 | 0.1000 | | 0.1000 | 0.1000 | 2.800 | 0.50 |

| | ΔT | Solder bridge and solder icicle | Strength (MPa) | Amount of dross | Cu leaching | Total evaluation |
|---|---|---|---|---|---|---|
| EX. 1 | Excellent | Excellent | Excellent | Excellent | Excellent | Excellent |
| EX. 2 | Excellent | Excellent | Excellent | Excellent | Excellent | Excellent |
| EX. 3 | Excellent | Excellent | Excellent | Excellent | Excellent | Excellent |
| EX. 4 | Excellent | Excellent | Excellent | Excellent | Excellent | Excellent |
| EX. 5 | Excellent | Excellent | Excellent | Excellent | Excellent | Excellent |
| EX. 6 | Good | Excellent | Excellent | Excellent | Excellent | Good |
| Ref. EX. 7 | Excellent | Excellent | Good | Excellent | Good | Good |
| EX. 8 | Excellent | Excellent | Excellent | Excellent | Excellent | Excellent |
| EX. 9 | Excellent | Excellent | Excellent | Excellent | Excellent | Excellent |
| EX. 10 | Excellent | Excellent | Excellent | Excellent | Excellent | Excellent |
| EX. 11 | Excellent | Excellent | Excellent | Excellent | Excellent | Excellent |
| Ref. EX. 12 | Excellent | Excellent | Excellent | Good | Excellent | Good |
| Ref. EX. 13 | Excellent | Excellent | Excellent | Good | Excellent | Good |
| Ref. EX. 14 | Excellent | Excellent | Excellent | Good | Excellent | Good |
| EX. 15 | Excellent | Excellent | Excellent | Excellent | Excellent | Excellent |
| EX. 16 | Excellent | Excellent | Excellent | Excellent | Excellent | Excellent |
| Comp. Ex. 1 | Excellent | Excellent | Poor | Acceptable | Poor | Poor |
| Comp. Ex. 2 | Excellent | Excellent | Poor | Good | Poor | Poor |
| Comp. Ex. 3 | Excellent | Excellent | Poor | Good | Poor | Poor |
| Comp. Ex. 4 | Good | Good | Good | Good | Acceptable | Poor |
| Comp. Ex. 5 | Poor | Poor | Good | Good | Good | Poor |
| Comp. Ex. 6 | Good | Good | Good | Good | Acceptable | Poor |
| Comp. Ex. 7 | Poor | Poor | Good | Good | Good | Poor |
| Comp. Ex. 8 | Good | Poor | Good | Poor | Good | Poor |
| Comp. Ex. 9 | Acceptable | Acceptable | Good | Good | Good | Poor |
| Comp. Ex. 10 | Poor | Poor | Good | Good | Good | Poor |
| Comp. Ex. 11 | Good | Acceptable | Good | Acceptable | Good | Poor |
| Comp. Ex. 12 | Acceptable | Acceptable | Good | Good | Good | Poor |
| Comp. Ex. 13 | Acceptable | Acceptable | Good | Good | Good | Poor |
| Comp. Ex. 14 | Poor | Poor | Good | Good | Good | Poor |
| Comp. Ex. 15 | Acceptable | Acceptable | Good | Good | Good | Poor |
| Comp. Ex. 16 | Acceptable | Acceptable | Good | Good | Good | Poor |

*Each underline indicates that it is outside the scope of the present invention.

As is clear from Table 1, the content of each constituent element in Examples 1 to 16 is appropriate, resulting in appropriate ΔT, almost no generation of solder bridges and solder icicles, high strength of the solder alloys, and reduced dross and Cu leaching. Particularly, it was confirmed that Examples 1 to 5, 8 to 11, 15, and 16, which satisfy relations (1) and (2), exhibited remarkably excellent results in all evaluation items.

On the other hand, in Comparative Example 1, the content of Cu was too low, resulting in low tensile strength, a large amount of dross, and the occurrence of Cu leaching. In Comparative Examples 2 and 3, the content of Cu was quite low, resulting in low tensile strength and the occurrence of Cu leaching. In Comparative Example 4, the content of Cu was low, resulting in the occurrence of Cu leaching.

In Comparative Examples 5 and 14, the Cu content was high, resulting in large ΔT and the generation of solder bridges and solder icicles.

In Comparative Example 6, the content of Ni was low, resulting in the occurrence of Cu leaching. In Comparative Examples 7 and 10, the content of Ni was high, resulting in large ΔT and the generation of solder bridges and solder icicles.

In Comparative Example 8, the content of Ge was low, resulting in the generation of solder bridges and solder icicles and a large amount of dross. In Comparative Example 9, the content of Ge was high, resulting in large ΔT and the generation of solder bridges and solder icicles.

In Comparative Example 11, Ga was contained, resulting in the generation of solder bridges and solder icicles and a large amount of dross.

In Comparative Examples 12 and 13, P was contained, resulting in large ΔT and generation of solder bridges and solder icicles.

In Comparative Examples 15 and 16, Co was contained, resulting in large ΔT and generation of solder bridges and solder icicles.

REFERENCE SIGN LIST

1 Dross Occurrence Apparatus

The invention claimed is:

1. A solder alloy having an alloy composition consisting of, by mass %:
Cu: more than 2.0% and less than 3.0%,
Ni: 0.10% or more and less than 0.30%, and
Ge: 0.0010 to 0.20%, with the balance being Sn, wherein the alloy composition satisfies the following relations (1) and (2):

2.700%≤Cu+Ni+Ge≤3.190%  relation (1)

0.33≤Ge/Ni≤1.04  relation (2)

wherein Cu, Ni, and Ge in the relations (1) and (2) each represent the contents (mass %) thereof in the alloy composition, and wherein the solder alloy comprises the following properties:
- a ΔT that is obtained by subtracting a solidus temperature from a liquidus temperature is less than 110° C.,
- no solder bridges or solder icicles are observed after flow soldering at a temperature of 255° C.,
- a tensile strength measured in accordance with JIS Z 3198-2 (2003) is 38 MPa or more,
- a dross weight is 25 g or less, and
- a dimension of copper wiring on a test sample is not reduced by half after immersion of seven times or more in jetting molten solder.

2. The solder alloy according to claim 1, wherein, by mass %, Cu: more than 2.5% and less than 3.0%.

3. A solder joint, comprising a solder alloy, wherein the solder alloy is the solder alloy according to claim 1.

4. A solder joint, comprising a solder alloy, wherein the solder alloy is the solder alloy according to claim 2.

* * * * *